(12) United States Patent
Crane

(10) Patent No.: US 7,082,932 B1
(45) Date of Patent: Aug. 1, 2006

(54) CONTROL SYSTEM FOR AN INTERNAL COMBUSTION ENGINE WITH A SUPERCHARGER

(75) Inventor: John C. Crane, Oshkosh, WI (US)

(73) Assignee: Brunswick Corporation, Lake Forest, IL (US)

(*) Notice: Subject to any disclaimer, the term of this patent is extended or adjusted under 35 U.S.C. 154(b) by 0 days.

(21) Appl. No.: 10/861,592

(22) Filed: Jun. 4, 2004

(51) Int. Cl.
F02B 33/00 (2006.01)
F02M 7/00 (2006.01)
B63H 20/14 (2006.01)
B63H 21/21 (2006.01)
B63H 23/00 (2006.01)

(52) U.S. Cl. .................. 123/559.1; 123/564; 123/561; 123/435; 440/75; 440/84

(58) Field of Classification Search ............ 123/559.1, 123/561, 564, 563, 65 R, 435; 440/75, 84
See application file for complete search history.

(56) References Cited

U.S. PATENT DOCUMENTS

| | | | |
|---|---|---|---|
| 4,386,587 A * | 6/1983 | Simko | 123/65 R |
| 4,519,373 A * | 5/1985 | Hardy et al. | 123/561 |
| 4,667,646 A * | 5/1987 | Shaw | 123/559.1 |
| 4,878,460 A * | 11/1989 | Uchida et al. | 123/563 |
| 4,951,638 A * | 8/1990 | Tsuboi et al. | 123/559.1 |
| 5,253,618 A * | 10/1993 | Takahashi et al. | 123/559.1 |
| 5,307,783 A | 5/1994 | Satoya et al. | 123/559.3 |
| 5,365,908 A * | 11/1994 | Takii et al. | 123/564 |
| 5,778,857 A * | 7/1998 | Nakamura et al. | 123/435 |
| 6,012,436 A * | 1/2000 | Boutcher | 123/559.1 |
| 6,082,340 A | 7/2000 | Heimark | 123/559.1 |
| 6,280,269 B1 * | 8/2001 | Gaynor | 440/84 |
| 6,375,442 B1 | 4/2002 | Ward et al. | 418/69 |
| 6,378,506 B1 | 4/2002 | Suhre et al. | 123/564 |
| 6,405,692 B1 | 6/2002 | Christiansen | 123/65 BA |
| 6,408,832 B1 | 6/2002 | Christiansen | 123/563 |
| 6,439,188 B1 | 8/2002 | Davis | 123/193.2 |
| 6,609,505 B1 | 8/2003 | Janson | 123/559.1 |
| 6,634,344 B1 | 10/2003 | Stretch | 123/559.3 |

FOREIGN PATENT DOCUMENTS

| | | | | |
|---|---|---|---|---|
| DE | 3102556 A1 * | 8/1982 | | 440/75 |
| EP | 254005 A1 * | 1/1988 | | |
| JP | 05141262 A * | 6/1993 | | 123/559.1 |

* cited by examiner

Primary Examiner—Thai-Ba Trieu
(74) Attorney, Agent, or Firm—William D. Lanyi

(57) ABSTRACT

A method is provided in which a marine propulsion system with a charge air compressor is controlled through the use of a clutch or a multiple speed transmission that allows the charge air compressor to be engaged or disengaged. The engagement or disengagement of the charge air compressor can be a dual function of the demand for a change in torque and the engine speed.

19 Claims, 3 Drawing Sheets

CONTROL SYSTEM FOR AN INTERNAL COMBUSTION ENGINE WITH A SUPERCHARGER

BACKGROUND OF THE INVENTION

1. Field of the Invention

The present invention relates generally to the control of a supercharger for an internal combustion engine and, more particularly, to the control of an engine that is used in a marine propulsion system in a way that improves both performance and operating efficiency.

2. Description of the Prior Art

Many different systems are known which use devices to pressurize the charged air for an internal combustion engine. Some of the systems are used in conjunction with marine propulsion systems.

U.S. Pat. No. 6,378,506, which issued to Suhre et al. on Apr. 30, 2002, discloses a control system for an engine supercharging system. A bypass control valve is controlled by an engine control module as a function of manifold absolute pressure and temperature within an air intake manifold in conjunction with the barometric pressure. An air per cylinder (APC) magnitude is calculated dynamically and compared to a desired APC value which is selected as a function of engine operating parameters. The air per cylinder value is calculated as a function of the manifold absolute pressure, the cylinder swept volume, the volumetric efficiency, the ideal gas constant, and the air inlet temperature. The volumetric efficiency is selected from stored data as a function of engine speed and a ratio of manifold absolute pressure to barometric pressure.

U.S. Pat. No. 6,408,832, which issued to Christiansen on Jun. 25, 2002, discloses an outboard motor with a charge air cooler. An outboard motor is provided with an engine having a screw compressor which provides a pressurized charge for the combustion chambers of the engine. The screw compressor has first and second screw rotors arranged to rotate about vertical axes which are parallel to the axes of the crankshaft of the engine. A bypass valve regulates the flow of air through a bypass conduit extending from an outlet passage of the screw compressor to the inlet passage of the screw compressor. A charge air cooler is used in a preferred embodiment and the bypass conduit then extends between the cold side plenum of the charge air cooler and the inlet of the compressor. The charge air cooler improves the operating efficiency of the engine and avoids overheating the air as it passes through the supercharger after flowing through the bypass conduit. The bypass valve is controlled by an engine control module in order to improve power output from the engine at low engine speeds while avoiding any violation of existing limits on the power of the engine at higher engine speeds.

U.S. Pat. No. 6,405,692, which issued to Christiansen on Jun. 18, 2002, discloses an outboard motor with a screw compressor supercharger. An outboard motor is provided with an engine having a screw compressor which provides a pressurized charge for the combustion chambers of the engine. A bypass valve regulates the flow of air through the bypass conduit extending from an outlet passage of the screw compressor to the inlet passage of the screw compressor. The bypass valve is controlled by an engine control module in order to improve power output from the engine at low engine speeds while avoiding any violation of existing limits on the power of the engine at higher engine speeds.

U.S. Pat. No. 6,439,188, which issued to Davis on Aug. 27, 2002, discloses a four cycle four cylinder in-line engine with rotors of a supercharging device used as balance shafts. A four cycle four cylinder in-line internal combustion engine is provided with a housing structure that contains two shafts which rotate in opposite directions to each other and at the same rotational velocity. Pairs of counterweights are attached to the two shafts in order to provide a counterbalancing force which is generally equal to an opposite from the secondary shaking force which results from the reciprocal movement of the pistons of the engine. The first and second shafts are rotors of a supercharging device, such as a Roots blower. The rotational speed of the first and second shafts is twice that of the rotational speed of the crankshaft of the engine and the provision of counterweights on the first and second shafts balances the secondary forces caused by the reciprocal motion of the piston in the engine.

U.S. Pat. No. 5,307,783, which issued to Satoya et al. on May 3, 1994, describes a boost pressure control system for an engine. The system is equipped with a supercharger and a torque converter having a lock-up clutch, in which the boost pressure is controlled by adjusting the degree of the opening of an air bypass valve and the ON/OFF position of the supercharger in such manner that the different control characteristics of the boost pressure are selected in accordance with whether the lock-up clutch of the torque converter is turned ON or OFF. In other words, when the lock-up clutch is turned ON, the supercharger is started at a lower engine load, and the degree of the opening of the air bypass valve is set smaller, thereby enabling the lock-up operation of the torque converter under running conditions in which a higher driving torque is required and, thereby widening the operating range of the lock-up operation of the torque converter and improving the fuel economy of the vehicle.

U.S. Pat. No. 6,609,505, which issued to Janson on Aug. 26, 2003, describes a two speed supercharger drive. A supercharger system for an internal combustion engine is described. The supercharger system includes a supercharger pump that is driven by the engine via a gear box. The gear box includes two planetary gear sets and a controllable clutch. A controller selectively activates the clutch to control the transition between the two speeds to assure a smooth transition without sudden changes in torque output.

U.S. Pat. No. 6,082,340, which issued to Heimark on Jul. 4, 2000, describes a two speed supercharger. The supercharger for a motor vehicle internal combustion engine is disclosed. The engine has an air intake, a crankshaft, a rotating engine accessory and shaft and the supercharger is driven by the rotating engine accessory shaft. The supercharger consists of a rotating turbine which receives atmospheric air and provides compressed air to the engine's air intake. The rotating turbine is connected to the rotating engine accessory shaft for rotational movement. In a preferred implementation, the rotating engine accessory is the alternator. A number of gears between the alternator shaft and the turbine increases the speed of the turbine relative to the alternator shaft. The apparatus may include a two speed clutch mounted on the engine's crankshaft to provide two speeds for the alternator shaft.

U.S. Pat. No. 6,634,344, which issued to Stretch on Oct. 21, 2003, describes a controlled engagement of a supercharger drive clutch. The preferred embodiment of the present invention provides a control system and method of controlling a supercharger having an input and a pair of rotors. The method comprises providing a magnetic particle clutch having an input member, an output member and a source of magnetic flux. In the presence of a magnetic field, a magnetically reactive medium disposed between the input and output members is transformed into a torque transmitting coupling that causes the clutch to transition from a disengaged state to an engaged state. The method includes sensing a vehicle parameter and generating a signal operable to engage the clutch in response to the sensed vehicle parameter, so that the transition to the engaged state may be controlled as a function of the sensed vehicle parameter.

U.S. Pat. No. 6,375,442, which issued to Ward et al. on Apr. 23, 2002, describes a supercharger clutch system. The system has a clutch housing in which a clutch pack is disposed to transmit torque from an input, such as a pulley, to one of the timing gears. The clutch pack is disposed within a cage, having a spring seat member adjacent thereto. A set of springs biases the seat member and the clutch cage to engage the clutch pack. On the opposite side, axially, of the clutch pack there is a piston including a portion surrounding the clutch cage and engaging the seat member. The piston and the clutch housing define a pressure chamber which, when pressurized, causes movement of the piston in a direction compressing the springs and disengaging the clutch pack. With the invention, the clutch system can be operated by engine lubrication oil, while still achieving rapid engagements, wherein the rate of engagement can be modulated to suit vehicle operating conditions.

The patents described above are hereby expressly incorporated by reference in the description of the preferred embodiment of the present invention.

Although it is generally known that a clutch can be used in conjunction with a supercharger in motor vehicles, such as automobiles, marine propulsion systems operate in a manner that is significantly different than land vehicles. A marine vessel typically spends a significant portion of its operating time with the engine at idle operating speed and the transmission in neutral gear position. In addition, as the speed of the engine is increased in a marine propulsion system, the boat eventually moves to a planing position, with the operation of the marine propulsion system being much more efficient when the boat is "on plane". When the marine propulsion system is either operating at idle speed or on plane, it does not require the full use of a supercharger. During periods of maximum acceleration and maximum requirement of thrust capability, the marine propulsion system can make efficient and advantageous use of the supercharger. It would therefore be significantly beneficial if a marine propulsion system could be provided with some way to activate and deactivate a supercharger based on the specific needs of the marine vessel.

SUMMARY OF THE INVENTION

A method for controlling the operation of an engine of a marine propulsion system, in accordance with a preferred embodiment of the present invention, comprises the steps of providing an internal combustion engine with an air intake conduit, providing a charge air compressor having an outlet conduit connected in fluid communication with the air intake conduit, providing a motive force to cause the charge air compressor to operate to provide compressed air from the outlet conduit to the air intake conduit, detecting a request for a change in torque output from the engine, such as a movement of a manually movable throttle control mechanism, and changing the operating speed of the charge air compressor as a function of that request for a change in torque output. Although many different signals and operating conditions could be used to designate the request for a change in torque output from the engine, the preferred embodiment of the present invention will be described below in terms of a specific embodiment in which the request for a change in torque output is embodied as a movement of a manually controlled throttle handle or, more simply stated, a throttle control mechanism.

A particularly preferred embodiment of the present invention further comprises the step of measuring an operating speed of the internal combustion engine. The changing step changes the operating speed of the charge air compressor as a dual function of both the detected movement of the manually movable throttle control mechanism and the operating speed of the internal combustion engine in a preferred embodiment of the present invention.

The internal combustion engine can comprise a crankshaft which is supported within the engine for rotation about a vertical axis, in one particularly preferred embodiment of the present invention, and the charge air compressor can be a screw compressor in a preferred embodiment of the present invention. The motive force can be a belt and pulley combination connected in torque transmitting relation between the charge air compressor and a rotating shaft of the internal combustion engine. The motive force can be a plurality of gears, in an alternative embodiment, that is connected in torque transmitting relation between the charge air compressor and a rotating shaft of the internal combustion engine.

The movement of a manually movable throttle control mechanism, or handle, can be a movement from a first gear position to a second gear position. The first gear position can be a neutral gear position and the second gear position can be a forward gear position or, alternatively, the first gear position can be a forward gear position and the second gear position can be a neutral gear position.

The preferred embodiment of the present invention further comprises the step of providing a clutch connected in torque transfer communication between the motive force and the charge air compressor, wherein the clutch is configured to selectively connect the motive force to the charge air compressor or disconnect the motive force from the charge air compressor. Alternatively, the preferred embodiment of the present invention can further comprise the step of providing a variable speed transmission connected in torque transfer communication between the motive force and the charge air compressor. The variable speed transmission can be configured to transmit a selected ratio of a speed of the motive force to the charge air compressor.

The step of detecting speed can comprise the step of determining if the manually movable throttle control mechanism is moving in a direction to command a higher engine operating speed.

BRIEF DESCRIPTION OF THE DRAWINGS

The preferred embodiment of the present invention will be more fully and completely understood from a reading of the description of the preferred embodiment in conjunction with the drawings, in which.

DESCRIPTION OF THE PREFERRED EMBODIMENT

Figure 1:
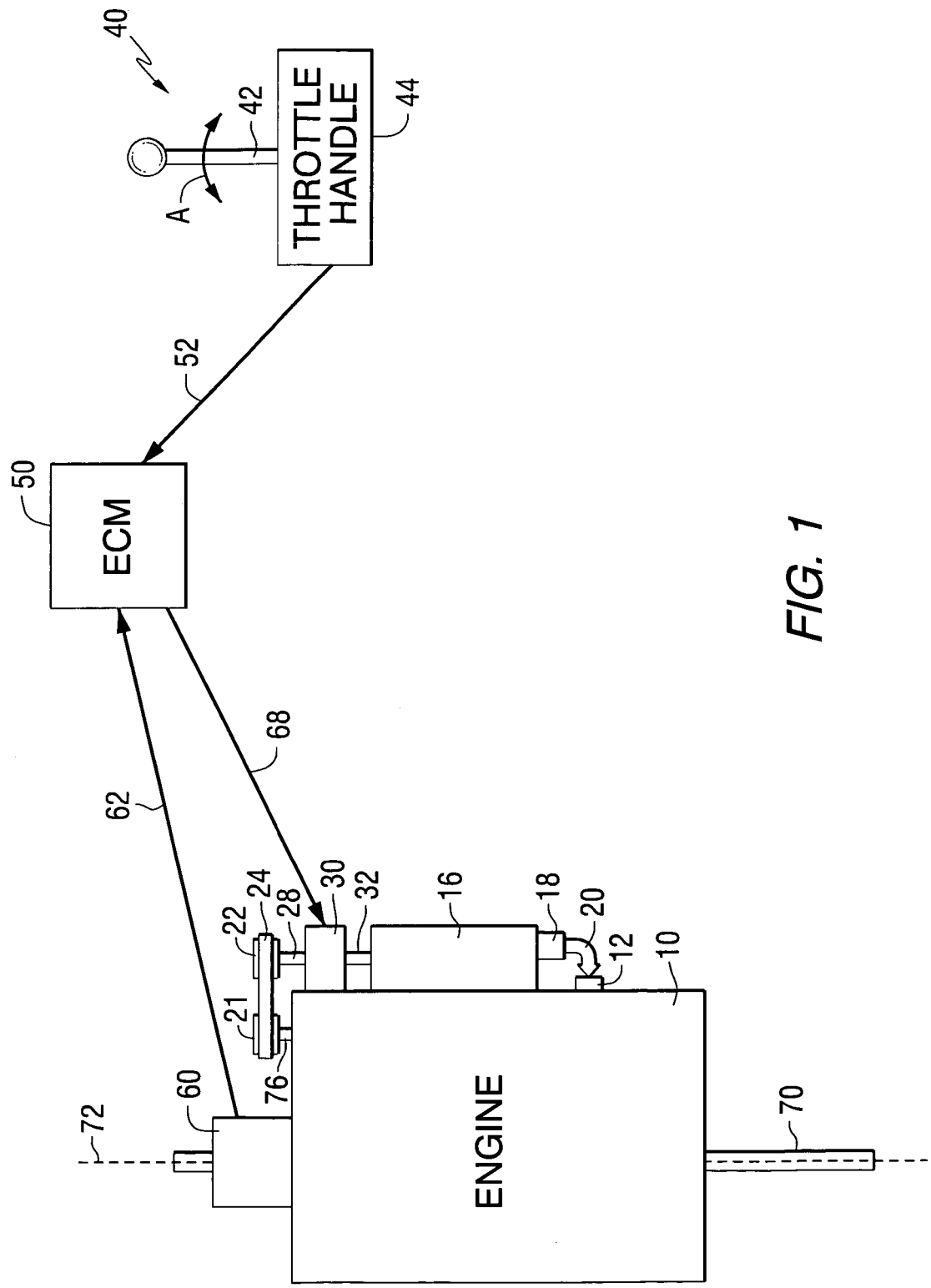
FIG. 1 is a simplified schematic representation of an apparatus for performing the steps of the preferred embodiment of the present invention.

Throughout the description of the preferred embodiment of the present invention, like components will be identified by like reference numerals.

As illustrated in FIG. 1, the preferred embodiment of the present invention provides an internal combustion engine 10 that has an air intake conduit 12. It also provides a charge air compressor 16 that has an outlet conduit 18 connected in fluid communication with the air intake conduit 12, as represented by arrow 20. The preferred embodiment of the present invention also provides a motive force to cause the charge air compressor 16 to operate to provide compressed air from the outlet conduit 18 to the air intake conduit 12. The motive force illustrated in FIG. 1 is a pulley and belt configuration in which a first pulley 21 drives a second pulley 22 through an interconnecting belt or chain 24. The first pulley 21 is driven by a shaft 76 that is rotated by the engine 10. The second pulley 22 is connected to a shaft 28 that is an input shaft to a component 30 which is able to change the operating speed of the charge air compressor 16 relative to the operating speed of the first and second pulleys, 21 and 22. As will be described in greater detail below, the operating speed changing device 30 can be a clutch or a variable speed drive that controls the operating speed of an output shaft 32 which can be different than the input shaft 28.

A preferred embodiment of the present invention further comprises the step of detecting movement of a manually movable throttle control mechanism 40 and changing the operating speed of the charge air compressor 16 as a function of detected movement of the manually movable throttle control mechanism 40. Alternative embodiments could detect movement of any part of the throttle control system, which includes the handle or any other component that affects a demand for torque from the engine. In the simplified representation of FIG. 1, a handle 42 can be moved, in directions represented by arrow A, relative to a housing structure 44. Those skilled in the art of marine propulsion systems are familiar with many different types of throttle handles that allow the operator of the marine vessel to change the direction of movement of the marine vessel and the operating speed of its engine by manipulating the position of the handle 42. An engine control module 50 receives signals from the throttle control mechanism 40, as represented by arrow 52, and causes the operating speed changing device 30 to determine a speed of its output shaft 32 in a manner controlled by the engine control module 50.

In a preferred embodiment of the present invention, the operating speed of the engine 10 is measured by a device such as a tachometer 60. The tachometer can provide a signal, as represented by arrow 62, to the engine control module 50. In certain embodiments, the engine control module uses both signals that are received from the throttle control mechanism 40, such as a manually movable handle, and from the engine speed detector 60, as represented by arrows 52 and 62, to provide a signal to the speed changing mechanism 30, as represented by arrow 68. In alternative embodiments, the request for a change in torque can be any other sort of signal which represents a demand, either manual or otherwise, for a change in the torque output from the engine. This demand for a change in torque could be from an engine control module (ECM) or other type of control device.

With continued reference to FIG. 1, those skilled in the art of marine propulsion systems are aware of the typical structure and operation of a throttle control mechanism 40. The operator of a marine vessel typically moves the handle 42, from a central position, in one direction to cause the transmission to shift into forward gear and in a reverse direction to cause the transmission to shift into reverse gear. As the operator moves the handle farther from its central position, the engine speed is increased in either forward or reverse gear. A certain amount of travel of the handle 42 on either side of its central position is used to command an idle speed of the engine as the transmission is being shifted between neutral gear and either forward or reverse gears. It should also be understood that, in a particularly preferred embodiment of the present invention, the system is a drive-by-wire system in which the signals, on arrow 52, are electronic signals and the throttle handle 42 is not physically connected to the engine. In other words, signals received by the engine control module 50 on line 52 are used by the engine control module to change the operating speed and transmission gear position without a direct physical connection by cables between these components.

With continued reference to FIG. 1, it should be understood that in a preferred embodiment of the present invention, the changing step changes the operating speed of the charge air compressor 16 as a dual function of both the detected movement of the throttle control mechanism 40 and the operating speed of the internal combustion engine 10 as measured by the tachometer 60.

In a preferred embodiment of the present invention, the internal combustion engine 10 comprises a crankshaft 70 which is supported within the engine 10 for rotation about a vertical axis 72. The charge air compressor 16 is a screw compressor in a preferred embodiment of the present invention and the motive force is a belt and pulley combination, represented by the first and second pulleys, 21 and 22, and the belt or chain 24 as described above. The belt and pulley combination is connected in torque transmitting relation between the charge air compressor 16 and a rotating shaft 76 of the internal combustion engine 10. Alternatively, the motive force can be a plurality of gears connected in torque transmitting relation between the charge air compressor 16 and a rotating shaft 76 of the internal combustion engine 10. Although not specifically illustrated in FIG. 1, those skilled in the art of marine propulsion systems are familiar with the connection between two shafts, such as shaft 76 and 28, with a plurality of gears.

The detected movement of the throttle control mechanism 40 is a movement between a first gear position and a second gear position. The first gear position can be a neutral gear position and the second gear position can be a forward gear position, as would occur when the operator of the marine vessel is shifting from neutral into forward gear. Alternatively, the first gear position can be a forward gear position and the second gear position can be a neutral gear position, as would occur when the operator of the marine vessel is shifting from forward gear to neutral gear as in a deceleration maneuver.

The operating speed changing device 30 can be a clutch that is connected in torque transfer communication between the motive force and the charge air compressor 16, with the clutch being configured to selectively connect the motive force, such as the belt and pulley arrangement shown in FIG. 1, to the charge air compressor 16 or disconnect the motive force from the charge air compressor. Alternatively, a variable speed transmission can perform the speed changing function if it is connected in torque transfer communication between the motive force and the charge air compressor 16.

The variable speed transmission could be configured to transmit a selected ratio of a speed of the motive force to the charge air compressor.

In addition to detecting the demand for a movement from a first gear position to a second gear position, the engine control module 50 can also detect a continued movement of the throttle handle 42 in a direction which commands an increase or decrease in engine operating speed. As described above, as the handle 42 is moved from its central position, the gear selection is made in response to further movement and, as the handle continues to move away from its central position, engine speed is commanded to increase.

Figure 2:
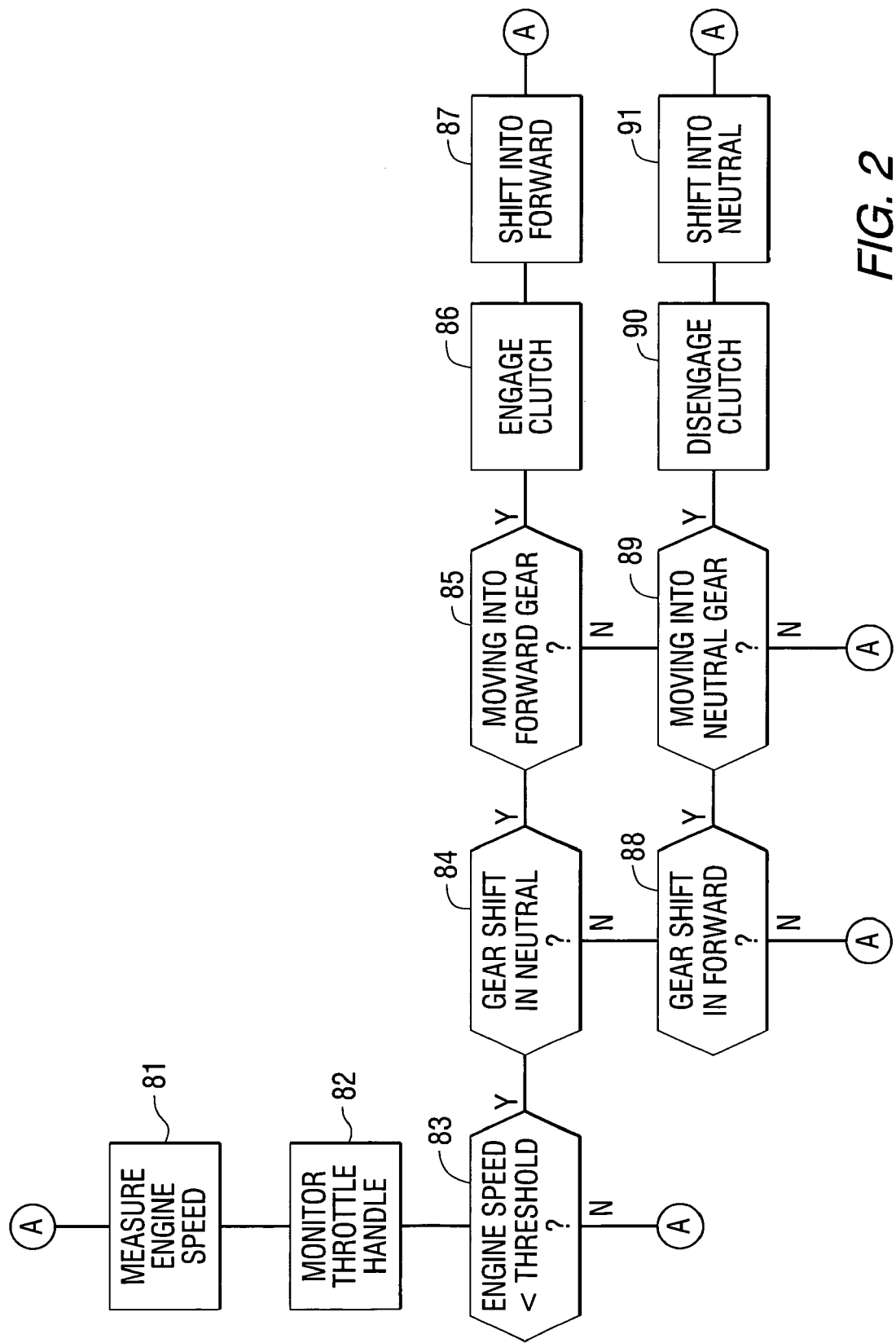
FIG. 2 is a simplified flowchart showing the steps of the preferred embodiment of the present invention.

FIG. 2 is a simplified flowchart showing the steps performed by the preferred embodiment of the present invention. Beginning with function block 81, the engine speed is measured, such as by a tachometer 60. The next functional block 82 shows that the throttle handle 42 is monitored to detect a movement relative to its housing 44. At functional block 83, the engine speed is interrogated to determine if it is less than a preselected, and possibly precalibrated, threshold magnitude. The threshold magnitude would typically be selected to identify the operation of the engine 10 at its idle speed or below a magnitude slightly greater than its idle speed. At functional block 84, the engine control module 50 determines whether or not the gear shift 42, or operator command, is in neutral gear position. If it is, the engine control module 50 determines whether or not the operator command, or handle 42, is moving from its central position toward a forward speed commanding position. This is done at functional block 85. If the operator is moving the handle 42 into forward gear, the clutch 30 is engaged as represented by functional block 86 and then the transmission is shifted into forward gear as represented by functional block 87. At this point, the logic returns to the beginning to once again measure the engine speed and monitor position of the throttle handle.

Functional block 88 determines whether the gear shift is in forward gear position. This is done after the determination that the gear shift is not in neutral gear position at functional block 84. If the gear shift is in its forward gear position, the preferred embodiment of the present invention determines whether or not the handle 42 is moving into neutral gear position. This is determined at functional block 89. If it is moving in a neutral gear position, the clutch 30 is disengaged at functional block 90 and then the transmission is shifted into neutral gear at functional block 91.

It should be understood that FIG. 2 is a highly simplified representation of one way in which the preferred embodiment of the present invention can be implemented. Alternative implementations are also within the scope of the preferred embodiment of the present invention.

Figure 3:
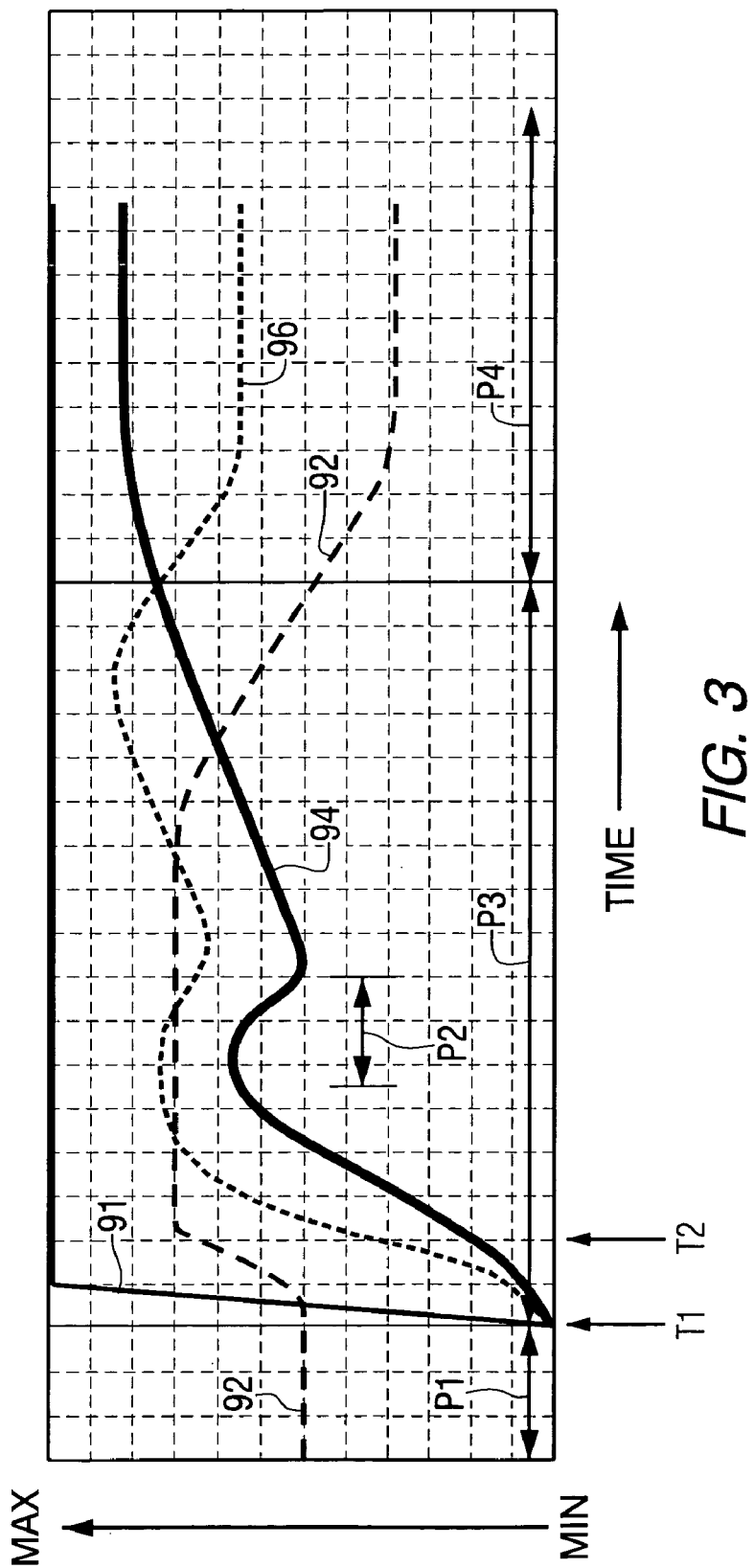
FIG. 3 is a graphical representation of the changes in several engine and charge air compressor in accordance with a preferred embodiment of the present invention.

FIG. 3 is a graphical representation showing one way in which a variable speed transmission can be used as the speed changing component 30 described above in conjunction with FIG. 1. If the speed changing component 30 is intended to merely select a disconnection or connection relationship between shaft 28 and shaft 32 of the charge air compressor 16, a simple clutch mechanism can be used. If, on the other hand, a continually adjustable speed selecting function is required, a variable speed or multispeed drive can be used as the operating speed changing mechanism 30 described above in conjunction FIG. 1.

With continued reference to FIG. 3, several relationships are graphically represented. The horizontal axis measures time of operation during a certain period of operation of the marine propulsion system. The vertical axis is used to represent a variation between a minimum magnitude and a maximum magnitude of the various parameters that are graphically represented. As an example, line 91 represents the engine torque demand in a exemplary scenario in which, at the time T1, the operator desires to rapidly increase the speed of the vessel to a planing speed. In the period of time represented by arrow P1, the charge air compressor speed is generally equal to the engine operating speed. This coincides with the ratio line 92, which represents the ratio between the speed of the charge air compressor and the speed of the engine, which is at a magnitude prior to time T1 that causes the charge air compressor 16 to operate at a speed that is generally equal to the operating speed of the engine 10. In response to the increase in torque demand 91, beginning at time T1, the ratio line 92 increases until time T2 so that the charge air compressor 16 is caused to rotate at a speed greater than the operating speed of the engine. This change in ratio allows the compressor to provide the maximum possible boost to the engine's operation. As a result, the engine can produce higher torque than if the compressor was driven at a fixed ratio. Ideally, the duration between T1 and T2 should be as brief as possible.

With continued reference to FIG. 3, line 94 represents the operating speed of the engine. The decrease in engine operating speed 94 during the period identified as P2 in FIG. 3 occurs as the marine vessel achieves planing speed. From that period on, the engine operating speed 94 increases consistently to the end of the period identified as P3. During the period identified as P3 in FIG. 3, the operating speed of the charge air compressor 16 is greater than the operating speed of the engine 94. The speed of the charge air compressor is represented by line 96. At the end of period P3 and beginning of period P4, the ratio 92 again crosses the magnitude which is equal to the magnitude prior to time T1, signifying a point when the charge air compressor 16 and engine 10 are operating at approximately the same speed or relative speed. During period P4, the ratio 92 decreases below that magnitude and the charge air compressor 16 rotates at a speed less than the engine 10. By changing the relative operating speed of the charge air compressor 16 relative to the operating speed of the engine 10, the charge air compressor can be operated more efficiently. At higher engine speeds, the compressor produces more compressed air than the engine can efficiently use. This inefficiency is avoided in the preferred embodiment of the present invention by driving the compressor at a speed less than the engine in this circumstance. so that it is providing compressed air to the air intake 12 of the engine 10 when it is most needed. In addition, the methodology represented graphically in FIG. 3 also diminishes the use of the charge air compressor 16 when it is not needed. This reduces the load that would otherwise have to be supported by the engine 10.

With reference to FIGS. 1–3, a method for controlling the operation of an engine of a marine propulsion system in accordance with a preferred embodiment of the present invention comprises the steps of providing an internal combustion engine 10 with an air intake conduit 12, providing a charge air compressor 16 having an outlet conduit 18 connected in fluid communication with the air intake conduit 12, providing a motive force (e.g. the first and second pulleys, 21 and 22, and the belt or chain 24) to cause the charge air compressor 16 to operate to provide compressed air from the outlet conduit 18 to the air intake conduit 12, detecting movement of the throttle control mechanism 40, and changing the operating speed of the charge air compressor 16, such as by the device identified by reference numeral 30, as a function of detected movement of the throttle control mechanism 40 or other operating parameters.

A preferred embodiment of the present invention further comprises the step of measuring an operating speed of the internal combustion engine 10 with a tachometer 60 and the changing step changes the operating speed of the charge air compressor 16 as a dual function of both the detected movement of the throttle control mechanism 40 and the operating speed of the internal combustion engine 10 as measured by the tachometer 60, or other operating parameters. The internal combustion engine 10 comprises a crankshaft 70 which is supported within the engine 10 for rotation about a vertical axis 72 and the charge air compressor 16 as a screw compressor in a preferred embodiment of the present invention. The motive force can be a belt 24 and pulley, 21 and 22, combination connected in torque transmitting relation between the charge air compressor 16 and a rotating shaft 76 of the internal combustion engine 10. Alternatively, the motive force can be a plurality of gears. Movement of the throttle control mechanism 40 is a movement from a first gear position to second gear position in a preferred embodiment. The first and second gears can be neutral gear and forward gear or, vice versa, it can be forward gear and neutral gear. The speed changing device 30 can be a clutch or a variable speed transmission.

Although the preferred embodiment of the present invention has been described in particular detail and illustrated to show a preferred embodiment, it should be understood that alternative embodiments are also within its scope.

I claim:

1. A method for controlling the operation of an engine of a marine propulsion system, comprising the steps of:
   providing an internal combustion engine with an air intake conduit;
   providing a charge air compressor having an outlet conduit connected in fluid communication with said air intake conduit;
   providing a motive force to cause said charge air compressor to operate to provide compressed air from said outlet conduit to said air intake conduit;
   detecting a demand for a change in torque;
   measuring an operating speed of said internal combustion engine; and
   changing the operating speed of said charge air compressor, relative to said operating speed of said internal combustion engine and as a function of detected demand for a change in torque,
   wherein said changing step changes said operating speed of said charge air compressor relative to said operating speed of said internal combustion engine and as a dual function of both said detected demand for a change in torque and said operating speed of said internal combustion engine, such that in response to engine torque demand to achieve a planing condition, operating speed of said engine and operating speed of said charge air compressor both increase, said operating speed of said engine increasing to a first speed and then decreasing to a second lower speed upon achieving said planing condition and then increasing again to a third speed, said operating speed of said charge air compressor decreasing during the increasing operating speed of said engine from second speed to said third speed.

2. The method of claim 1, wherein:
   said internal combustion engine comprises a crankshaft which is supported within said engine for rotation about a vertical axis.

3. The method of claim 1, wherein:
   said charge air compressor is a screw compressor.

4. The method of claim 1, wherein:
   said motive force is a belt and pulley combination connected in torque transmitting relation between said charge air compressor and a rotating shaft of said internal combustion engine.

5. The method of claim 1, wherein:
   said motive force is a plurality of gears connected in torque transmitting relation between said charge air compressor and a rotating shaft of said internal combustion engine.

6. The method of claim 1, wherein:
   said first gear position is a neutral gear position and said second gear position is a forward gear position.

7. The method of claim 1, wherein:
   said first gear position is a forward gear position and said second gear position is a neutral gear position.

8. The method of claim 1, further comprising:
   providing a clutch connected in torque transfer communication between said motive force and said charge air compressor, said clutch being configured to selectively connect said motive force to said charge air compressor or disconnect said motive force from said charge air compressor.

9. The method of claim 1, further comprising:
   providing a variable speed transmission connected in torque transfer communication between said motive force and said charge air compressor, said variable speed transmission being configured to transmit a selected ratio of a speed of said motive force to said charge air compressor.

10. The method of claim 1, wherein:
    said detecting step comprises the step of determining if a manually movable throttle control mechanism is moving in a direction to command a higher engine operating speed.

11. The method of claim 1 wherein a plot of said decreasing operating speed of said charge air compressor crosses a plot of said increasing operating speed of said engine between said second and third speeds at a cross-over point.

12. The method of claim 11 wherein:
    at operating speeds of said engine between said second speed and said cross-over point, said operating speed of said charge air compressor is greater than said operating speed of said engine; and
    at operating speeds of said engine greater than said cross-over point, said operating speed of said charge air compressor is less than said operating speed of said engine.

13. The method of claim 1 wherein said third speed is greater than said first speed.

14. The method of claim 1 wherein the operating speed of said charge air compressor is greater than the operating speed of said engine at each of said first and second speeds.

15. The method of claim 1 wherein:
    the operating speed of said charge air compressor is greater than the operating speed of said engine at said first speed;
    the operating speed of said charge air compressor is greater than the operating speed of said engine at said second speed; and
    the operating speed of said charge air compressor is less than the operating speed of said engine at said third speed.

16. A method for controlling the operation of an engine of a marine propulsion system, comprising the steps of:

providing an internal combustion engine with an air intake conduit, said internal combustion engine comprising a crankshaft which is supported within said engine for rotation about a vertical axis;

providing a charge air compressor having an outlet conduit connected in fluid communication with said air intake conduit;

providing a motive force to cause said charge air compressor to operate to provide compressed air from said outlet conduit to said air intake conduit;

measuring an operating speed of said internal combustion engine;

detecting movement of a manually movable throttle control mechanism; and changing the operating speed of said charge air compressor relative to said operating speed of said internal combustion engine and as a dual function of both said detected movement of said manually movable throttle control mechanism and said operating speed of said internal combustion engine, said charge air compressor being a screw compressor, said movement of a manually movable throttle control mechanism being a movement from a first gear position to a second gear position, such that in response to engine torque demand to achieve a planing condition, operating speed of said engine and operating speed of said charge air compressor both increase, said operating speed of said engine increasing to a first speed and then decreasing to a second lower speed upon achieving said planing condition and then increasing again to a third speed, said operating speed of said charge air compressor decreasing during the increasing operating speed of said engine from second speed to said third speed.

17. The method of claim 16, further comprising:

providing a clutch connected in torque transfer communication between said motive force and said charge air compressor, said clutch being configured to selectively connect said motive force to said charge air compressor or disconnect said motive force from said charge air compressor.

18. The method of claim 17, wherein:

said detecting step comprises the step of determining if said manually movable throttle control mechanism is moving in a direction to command a higher engine operating speed.

19. The method of claim 16, further comprising:

providing a variable speed transmission connected in torque transfer communication between said motive force and said charge air compressor, said variable speed transmission being configured to transmit a selected ratio of a speed of said motive force to said charge air compressor.

* * * * *